(12) United States Patent
Thurlow et al.

(10) Patent No.: US 11,115,703 B2
(45) Date of Patent: Sep. 7, 2021

(54) PLATFORMS, MEDIA, AND METHODS PROVIDING A FIRST PLAY STREAMING MEDIA STATION

(71) Applicant: Feed Media Inc., San Francisco, CA (US)

(72) Inventors: James Thurlow, Pleasanton, CA (US); Tiffany Sirikulvadhana, South San Francisco, CA (US); Lauren Pufpaf, Danville, CA (US); Jeff Yasuda, San Francisco, CA (US); Eric Lambrecht, Oakland, CA (US); Kim Cuartero, Dublin, CA (US)

(73) Assignee: Feed Media Inc., San Francisco, CA (US)

( * ) Notice: Subject to any disclaimer, the term of this patent is extended or adjusted under 35 U.S.C. 154(b) by 0 days.

(21) Appl. No.: 16/721,784

(22) Filed: Dec. 19, 2019

(65) Prior Publication Data
US 2021/0195277 A1    Jun. 24, 2021

(51) Int. Cl.
*H04N 21/43* (2011.01)
*G10H 1/00* (2006.01)
*H04N 21/254* (2011.01)
*H04N 21/439* (2011.01)

(52) U.S. Cl.
CPC ....... *H04N 21/4307* (2013.01); *G10H 1/0025* (2013.01); *H04N 21/2541* (2013.01); *H04N 21/4394* (2013.01); *G10H 2220/091* (2013.01); *G10H 2240/325* (2013.01)

(58) Field of Classification Search
CPC .. G10H 1/40; G10H 1/0025; G10H 2240/325; G10H 2220/091; G06F 3/16; G06F 3/0484; A63B 71/06; H04N 21/4307; H04N 21/2541; H04N 21/4394
See application file for complete search history.

(56) References Cited

U.S. PATENT DOCUMENTS

| | | | |
|---|---|---|---|
| 8,568,277 B2 | 10/2013 | Johnson | |
| 9,880,805 B1* | 1/2018 | Guralnick | ............... G06F 3/165 |
| 10,187,677 B1 | 1/2019 | Panchaksharaiah et al. | |
| 10,516,914 B2 | 12/2019 | Sprenger et al. | |
| 10,572,216 B2* | 2/2020 | Craggs | ................... G06Q 50/01 |
| 2003/0081859 A1* | 5/2003 | Kasutani | ................... G06T 7/90 |
| | | | 382/305 |

(Continued)

*Primary Examiner* — William L Bashore
*Assistant Examiner* — Gregory A Distefano
(74) *Attorney, Agent, or Firm* — Wilson Sonsini Goodrich & Rosati

(57) ABSTRACT

Disclosed herein are media, systems, and methods of creating and publishing a first play station, wherein a media creator is allowed to select a plurality of audio media and sequence the selected audio media to create an ordered combination and request a first play station. Each audio media in the ordered combination is validated to create a first play station, and the media creator is allowed to play the first play station. After the first play station is published, a call from a third party player application prompts the published first play station. At least one alteration to the ordered combination of validated audio media can be generated, wherein the at least one alteration is selected from the group consisting of: an alternate validated audio media, an alternate sequence of the ordered combination of validated audio media, or a combination thereof.

28 Claims, 8 Drawing Sheets

(56) References Cited

U.S. PATENT DOCUMENTS

| | | | |
|---|---|---|---|
| 2004/0019497 A1* | 1/2004 | Volk | H04N 21/25875 |
| | | | 705/1.1 |
| 2006/0085349 A1* | 4/2006 | Hug | H04H 60/23 |
| | | | 705/57 |
| 2006/0143236 A1* | 6/2006 | Wu | G11B 27/034 |
| 2009/0075782 A1* | 3/2009 | Joubert | H03G 3/32 |
| | | | 482/9 |
| 2012/0041954 A1* | 2/2012 | Curtis | H04N 21/214 |
| | | | 707/740 |
| 2013/0028574 A1* | 1/2013 | Srinivas | G11B 27/10 |
| | | | 386/278 |
| 2014/0018947 A1 | 1/2014 | Ales | |
| 2015/0128788 A1* | 5/2015 | Brewer | G10H 1/0008 |
| | | | 84/609 |
| 2016/0346604 A1* | 12/2016 | Lindstrom | G06F 16/68 |
| 2018/0109837 A1 | 4/2018 | Sprenger et al. | |
| 2018/0343505 A1 | 11/2018 | Loheide et al. | |
| 2018/0374461 A1* | 12/2018 | Serletic | H04N 9/8211 |
| 2020/0074969 A1* | 3/2020 | Cannistraro | G11B 27/005 |

* cited by examiner

PLATFORMS, MEDIA, AND METHODS PROVIDING A FIRST PLAY STREAMING MEDIA STATION

BACKGROUND

Streaming media services are prevalent today to satisfy our audio and video needs. Content creators who publish or stream online content have to abide by legal rules (e.g., copyright).

SUMMARY

Individuals currently have no way to legally program non-interactive music that aligns with their video content, especially fitness instructors who want intros, main segments, and outros to enhance their workout sessions. Individuals who download music tracks and then sync this music with video content they create cannot legally do so unless they have obtained proper licensing for the music they are using. Hence, a technological tool to assist online content creators that want to utilize interactive music while complying with legal copyright rules is needed.

In some embodiments, the claimed subject matter allows individuals to request, via a web interface, a station of non-interactive (streaming) music with songs that are specific to enhancing the overall media experience based customized intros, crossfade periods, and outros. In some embodiments, these settings can be provided at a global level for all stations or individually that station level. In some embodiments, once a first play station is developed, the end user can overlay the station to their video content by playing it while the video portion is being recorded live. In some embodiments, the claimed subject matter offers an improved graphical user interface allowing the media content creator to more efficiently and effectively identifying the appropriate or validated audio content for their first play station.

In one aspect, disclosed herein are: a platform comprising: (a) at least one server comprising at least one processor, an operating system configured to perform executable instructions, a memory, and a computer program including instructions executable to cause the at least one server to perform at least the following: (i) provide a first user interface allowing a media creator to select a plurality of audio media and sequence the selected audio media to create an ordered combination of audio media and request a first play station; (ii) validate each audio media in the ordered combination to create a first play station; (iii) provide a second user interface allowing the media creator to play the first play station; (iv) publish the first play station; (v) receive a call from a third party player application to prompt the published first play station; and (vi) generate at least one alteration to the ordered combination of validated audio media, wherein the at least one alteration is selected from the group consisting of: an alternate validated audio media, an alternate sequence of the ordered combination of validated audio media, or a combination thereof; and (b) at least one end user device comprising at least one processor, an operating system configured to perform executable instructions, a memory, and a computer program including instructions executable by the end user device to cause the end user device to perform at least the following: (i) provide a third party application allowing an end user to play a video; wherein a start of the video sends the call from the third party player application to the published first play station to start the published first play station so the starts of the video and the published first play station are paired; wherein in an initial play by the end user the published first play station consists of the ordered combination of validated audio media; and wherein in each subsequent play by the end user the published first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media. In some embodiments, the computer program including instructions executable to cause the at least one server to further perform: provide a third user interface configured to allow the setting of global configuration values.

In another aspect, disclosed herein are non-transitory computer-readable storage media encoded with a computer program including instructions executable by the one or more processors to create and publish a first play station comprising: (a) a software module configured to provide a first user interface allowing a media creator to select a plurality of audio media and sequence the selected audio media to create an ordered combination of audio media and request a first play station; (b) a software module configured to validate each audio media in the ordered combination to create a first play station; (c) a software module configured to provide a second user interface allowing the media creator to play the first play station; (d) a software module configured to publish the first play station; and (e) a software module configured to receive a call from a third party player application to prompt the published first play station; and (f) a software module configured to generate at least one alteration to the ordered combination of validated audio media, wherein the at least one alteration is selected from the group consisting of: an alternate validated audio media, an alternate sequence of the ordered combination of validated audio media, or a combination thereof; wherein a start of a video on the third party player application sends the call to the published first play station to start the published first play station so the starts of the video and the published first play station are paired, wherein an initial play of the published first play station consists of the ordered combination of validated audio media; and wherein in each subsequent play of the published first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media. In some embodiments, the media encoded with a computer program including instructions executable by the one or more processors further comprises a software module configured to provide a third user interface configured to allow the setting of global configuration values.

In another aspect, disclosed herein is a computer-implemented method of creating and publishing a first play station, the method comprising: (a) providing a first user interface allowing a media creator to select a plurality of audio media and sequence the selected audio media to create an ordered combination of audio media and request a first play station; (b) validating each audio media in the ordered combination to create a first play station; (c) providing a second user interface allowing the media creator to play the first play station; (d) publishing the first play station; (e) receiving a call from a third party player application to prompt the published first play station; and (f) generating at least one alteration to the ordered combination of validated audio media, wherein the at least one alteration is selected from the group consisting of: an alternate validated audio media, an alternate sequence of the ordered combination of validated audio media, or a combination thereof, wherein a start of a video on the third party player application sends the call to the published first play station to start the published first play station so the starts of the video and the published first play station are paired, wherein an initial play of the first published play station consists of the ordered combination of validated audio media; and wherein in each subsequent play of the published first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media. In some embodiments, the computer-implemented method further comprises providing a third user interface configured to allow the setting of global configuration values.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
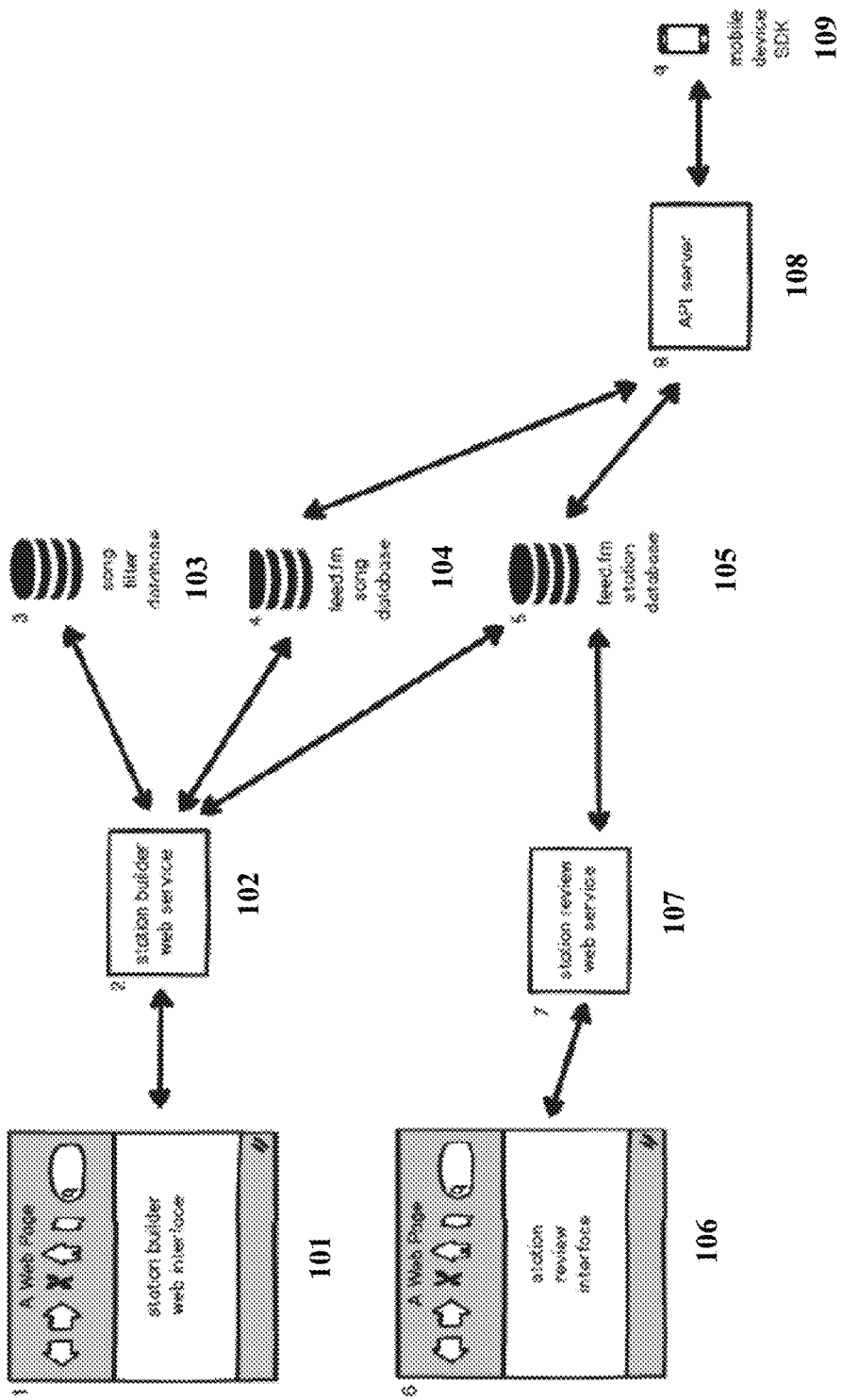
FIG. 1 shows a non-limiting example of a flowchart; in this a case, a flowchart describing the process of creating a first play station to be used by end users.

Described herein, in certain embodiments, are: a platform comprising: (a) at least one server comprising at least one processor, an operating system configured to perform executable instructions, a memory, and a computer program including instructions executable to cause the at least one server to perform at least the following: (i) provide a first user interface allowing a media creator to select a plurality of audio media and sequence the selected audio media to create an ordered combination of audio media and request a first play station; (ii) validate each audio media in the ordered combination to create a first play station; (iii) provide a second user interface allowing the media creator to play the first play station; (iv) publish the first play station and a video; (v) generate at least one alteration to the ordered combination of validated audio media, wherein the at least one alteration is selected from the group consisting of: an alternate validated audio media, an alternate sequence of the ordered combination of validated audio media, or a combination thereof; and (b) at least one end user device comprising at least one processor, an operating system configured to perform executable instructions, a memory, and a computer program including instructions executable by the end user device to cause the end user device to perform at least the following: (i) provide a third user interface allowing an end user to play the video and the first play station; wherein a start of the video and a start of the first play station are synchronized; wherein in an initial play by the end user the first play station consists of the ordered combination of validated audio media; and wherein in each subsequent play by the end user the first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media.

Also described herein, in certain embodiments, are non-transitory computer-readable storage media encoded with a computer program including instructions executable by the one or more processors to create and publish a first play station comprising: (a) a software module configured to provide a first user interface allowing a media creator to select a plurality of audio media and sequence the selected audio media to create an ordered combination of audio media and request a first play station; (b) a software module configured to validate each audio media in the ordered combination to create a first play station; (c) a software module configured to provide a second user interface allowing the media creator to play the first play station; (d) a software module configured to publish the first play station and a video; and (e) a software module configured to generate at least one alteration to the ordered combination of validated audio media, wherein the at least one alteration is selected from the group consisting of: an alternate validated audio media, an alternate sequence of the ordered combination of validated audio media, or a combination thereof; wherein a start of the published first play station and a start of the published first play station are synchronized, wherein an initial play of the first play station consists of the ordered combination of validated audio media; and wherein in each subsequent play of the first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media.

Also described herein, in certain embodiments, are computer-implemented method of creating and publishing a first play station, the method comprising: (a) providing a first user interface allowing a media creator to select a plurality of audio media and sequence the selected audio media to create an ordered combination of audio media and request a first play station; (b) validating each audio media in the ordered combination to create a first play station; (c) providing a second user interface allowing the media creator to play the first play station; (d) publishing the first play station and a video; (e) generating at least one alteration to the ordered combination of validated audio media, wherein the at least one alteration is selected from the group consisting of: an alternate validated audio media, an alternate sequence of the ordered combination of validated audio media, or a combination thereof, wherein a start of the published first play station and a start of the published first play station are synchronized, wherein an initial play of the first play station consists of the ordered combination of validated audio media; and wherein in each subsequent play of the first play station comprises the at least one alteration to the ordered combination of validated audio media. In some embodiments, the first user interface further allows the media creator to select audio media based on title, genre, beats per minute (bpm), tempo, artist, duration, language, record label, composer, date, media franchise, medium, awards, album, explicit language, or any combination thereof. In some embodiments, validating audio media comprises checking compliance with copyright playback rules or licensing restrictions. In some embodiments, the first user interface further allows the media creator to configure within the ordered combination of audio media an intro timepoint, an outro timepoint, or any combination thereof. In some embodiments, when the first play station reaches a configured intro timepoint, the first play station automatically trims a current validated audio media and crossfades to a next validated audio media. In some embodiments, when the first play station reaches a configured outro timepoint, the first station automatically trims a current validated audio media and crossfades to a next validated audio media. In some embodiments, the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof. In some embodiments, the first user interface further color codes one or more segments. In some embodiments, the first user interface further allows the media creator to configure a crossfade time for one or more validated audio media. In some embodiments, the second user interface further provides one or more visual cues when the first play station is playing. In some embodiments, publishing the video comprises streaming the video to one or more end user devices. In some embodiments, the alternate validated audio media is different from the validated audio media. In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the first user interface further displays a running tally of the ordered combination of audio media after every selected audio media.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

A "SDK," as used herein, refers to a software development kit.

Referring to FIG. 1, a flowchart is shown depicting an exemplary process of creating a first play station to be used by end users. In some embodiments, a Station Builder Web interface 101, an interactive web page where users can search for songs and arrange them in an ordered list to become a "station request," is provided. In some embodiments, users enter notable timestamps (such as "end of warmup period" and "start of cooldown period") and playback configuration data (such as "cross fade time"). In some embodiments, all collected data is submitted to the station builder web service 102. In some embodiments, the Station Builder Web Service 102 is a web service that receives song search requests from the web interface 101 and filters out songs also found in the filter database 103. In some embodiments, this service accepts the full "station request" from the web interface and validates it against DMCA playback rules. In some embodiments, if the station passes all rules, the individual songs are matched up to songs in the song database 104 or recorded as "placeholders" for purchase. In some embodiments, the collection of songs, special timestamps and playback configuration are recorded as a "station" in the station database 105. In some embodiments, the song filter database 103 is a database of song titles and artist names that have been temporarily deemed ineligible for playback, typically due to licensing issues. In some embodiments, the song database 104 is a database of all the songs available for playback. In some embodiments, a station review interface 106, which is an interactive web page where a user can listen to a constructed station and submit feedback about the station to the Station Review Web Service 107, is provided. In some embodiments, the Station Review Web Service is a web service that accepts comments from station reviewers and stores them in the station database 105. In some embodiments, an API server 108, an Internet service that accepts authenticated requests from the mobile device software development kit (SDK) 109, is provided. In some embodiments the API server 108 retrieves station contents and song data from the station database 105 and song database 104, and ensures mobile clients are adhering to DMCA playback rules and sends the song data to the mobile device. In some embodiments, the mobile device SDK 109 comprises a library incorporated into mobile applications that handles retrieving songs from the API server 108, playing them on the mobile device, and reporting the playback back to the API servers.

Figure 2:
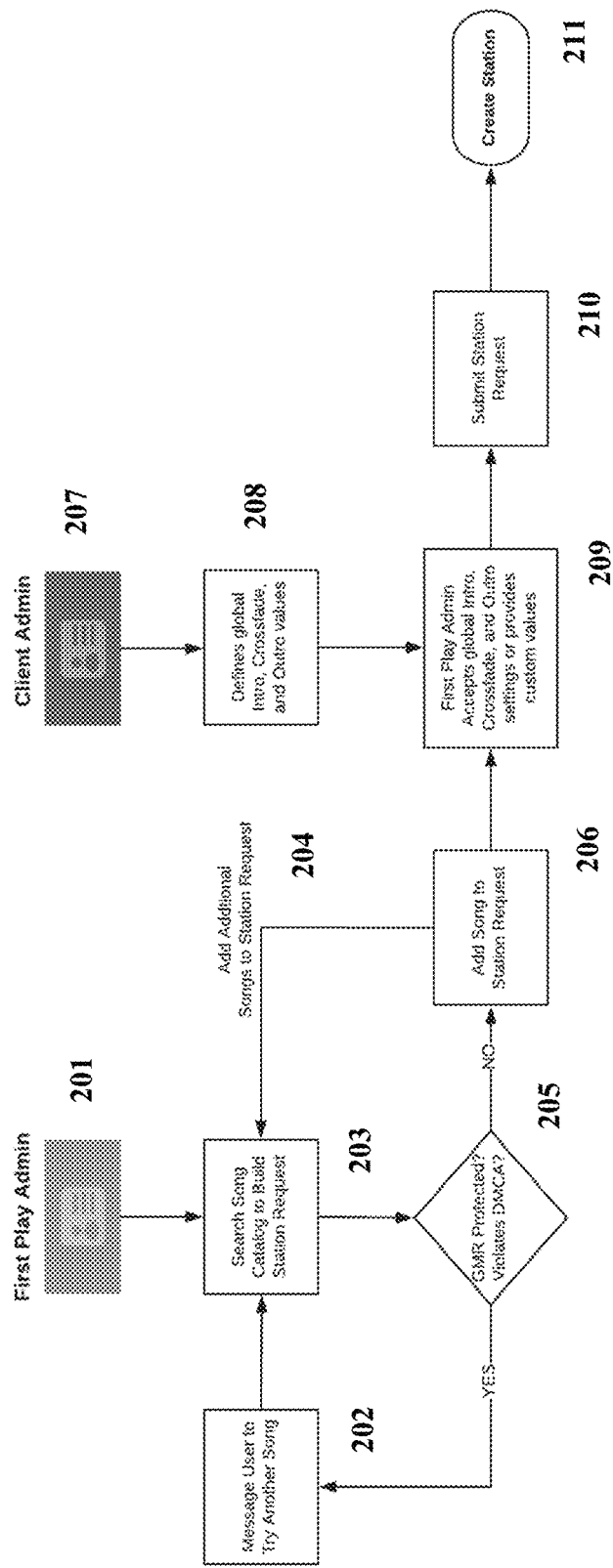
FIG. 2 shows a non-limiting example of a flowchart; in this case, a flowchart describing the process of creating and submitting a first play station.

Referring to FIG. 2, a flow chart is shown depicting the process of submitting and creating a first play station. In some embodiments, a first play administrator 201 searches a song catalog to build a station request 203. In some embodiments, each song in the catalog is analyzed to determine whether global music rights (GMR) protection applies, whether playing such song violates the Digital Millennium Copyright Act (DMCA), or whether any other licensing or copyright issues are implicated 205. In some embodiments, if the user selected song has GMR protection, would violate DMCA, or implicate other licensing or copyright issues, then the user is messaged to try to select another song 202. In some embodiments, however, if no GMR, DMCA, copyright, or licensing issues exist, then the song is added to the station request 206. In some embodiments, the user can add additional songs to the station request 204. In some embodiments, a client administrator 207 is provided. In some embodiments, the client administrator defines global intro values, crossfade values, and outro values 208. In some embodiments, the first play administrator accepts the global intro values, crossfade values, outro value settings, other variables, or a combination thereof, or alternatively provides custom values 209. In some embodiments, the intro timepoint or value designates the start and/or end of a warmup segment for a workout music station. In some embodiments, the outro timepoint or value designates the start and/or end of a main segment or a cooldown segment for a workout music station. In some embodiments, after the values, timepoints, crossfades, and variables are set (e.g., accepted by first play administrator or custom values provided), the station request is submitted 210 and then created 211.

Figure 3:
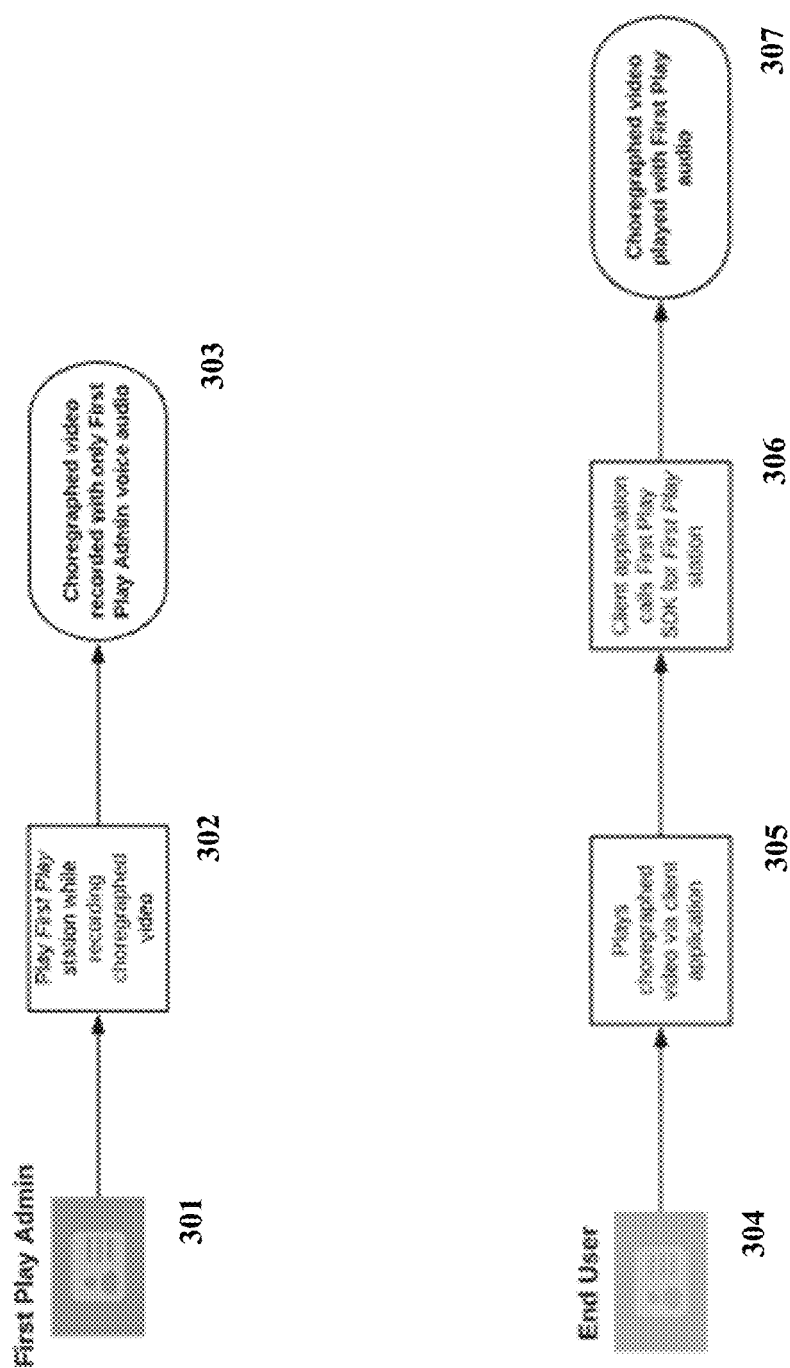
FIG. 3 shows a non-limiting example of a flowchart; in this case, a flow chart describing the process of creating a video associated with a first play station.

Referring to FIG. 3, a flow chart is shown depicting the process of creating a video alongside a first play station. In some embodiments, a first play administrator 301 plays a first play station while simultaneously recording a choreographed video 302. In some embodiments, the video is a workout video. In some embodiments, the video is an instructional video on one or more topics (make-up, cooking, home repairs, math, English, writing, etc.). In some embodiments, the video is a gaming video. In some embodiments, the video is any streaming content. In some embodiments, a choreographed video is recorded with only the First play administration voice audio 303. In some embodiments, an end user is provided 304. In some embodiments, the end user plays the choreographed video via a client application 305. In some embodiments, the client application calls the First Play SDK for the First Play station 306. In some embodiments, the choreographed video is played with First Play audio 307.

Figure 4:
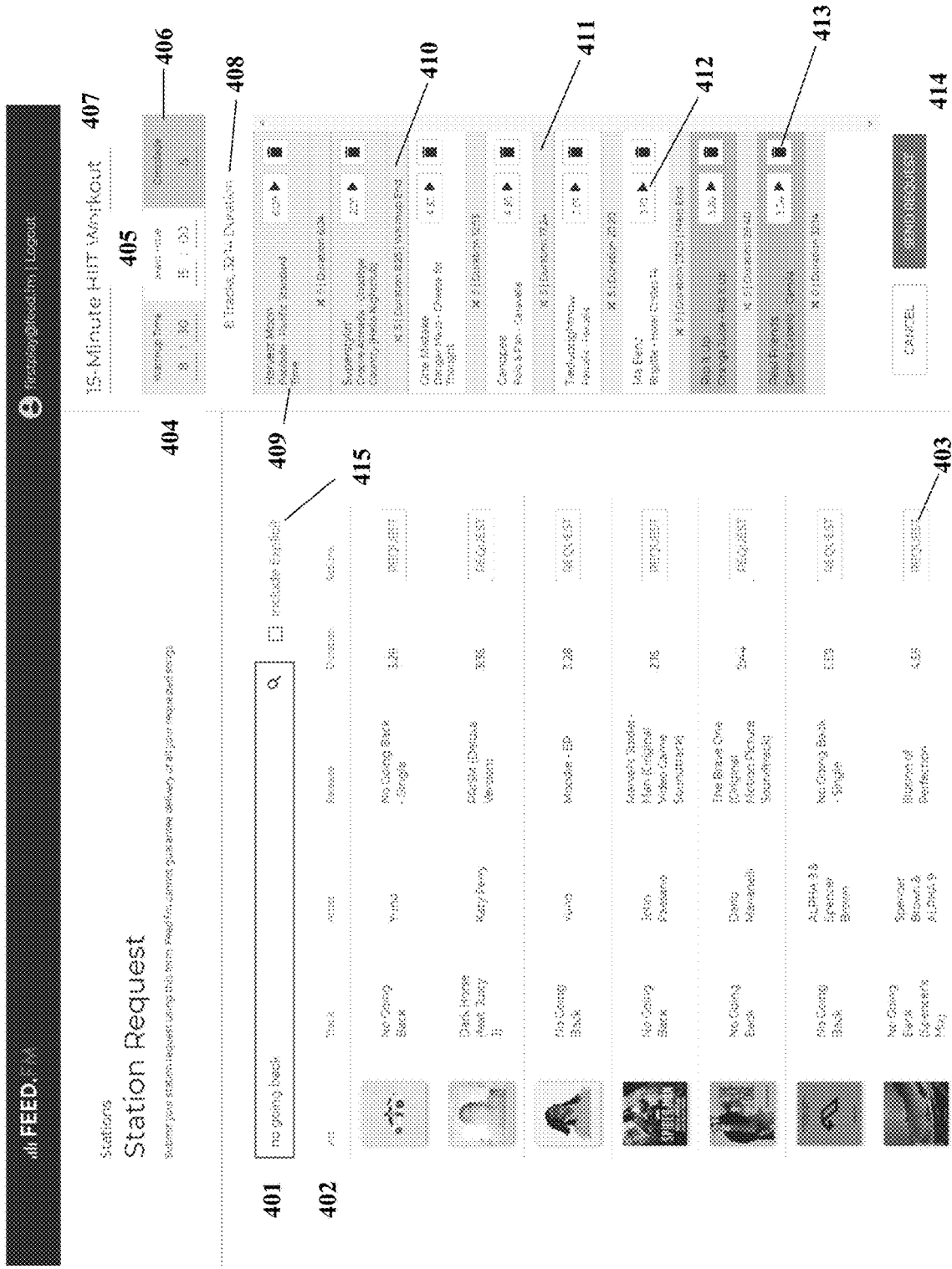
FIG. 4 shows a non-limiting example of a graphical user interface; in this case, a user interface depicting a plurality of audio media for a media creator to select and sequence.

Referring to FIG. 4, an exemplary station request user interface depicting a plurality of audio media for a media creator to select and sequence is shown. In some embodiments, a user can search for one or more songs based on key words 401. In some embodiments, a user can filter songs based on whether the songs include or does not include explicit or profane language 415. In some embodiments, the station request user interface can organize and display a catalog of song choices based on a variety of categories 402, including, but not limited to: title, genre, beats per minute (bpm), tempo, artist, duration, language, record label, composer, date, media franchise, medium, awards, album, explicit language, or any combination thereof. In some embodiments, a user can select one or more songs to include in an ordered combination to eventually be included in a first play station be selecting the "REQUEST" graphical user interface icon 403. In some embodiments, the user can title the ordered combination of songs 407. In some embodiments, the user can designate a timepoint when the warmup period will end 404. In some embodiments, the user can designate a timepoint when the main segment will end 405. In some embodiments, the user can designate or customize the length of crossfade time between selected songs 406. In some embodiments, a crossfade occurs only if the user has provided a crossfade value. In some embodiments, the total number of tracks and the total duration of selected songs is presented 408. In some embodiments, the selected song appears on the right side of the station request user interface 409 in the order they were selected. In some embodiments, the user can re-arrange the initial ordered combination of songs on the right side of the station request user interface by selecting and dragging the one or more songs to the order the user desires. In some embodiments, the station request user interface depicts when the designated warmup period, main segment, or cooldown will end 410. In some embodiments, the station request user interface depicts the total duration of time that has elapsed after any given song 411. In some embodiments, a running tally of the station duration after each song is depicted. In some embodiments, the user can play 412 or discard 413 a previously selected song within the ordered combination of songs. In some embodiments, the songs to be played during the warmup segment is designated a first color, the songs to be played during the main segment is displayed in a second color, and the songs to be played during the cooldown segment is displayed in a third color.

Figure 5:
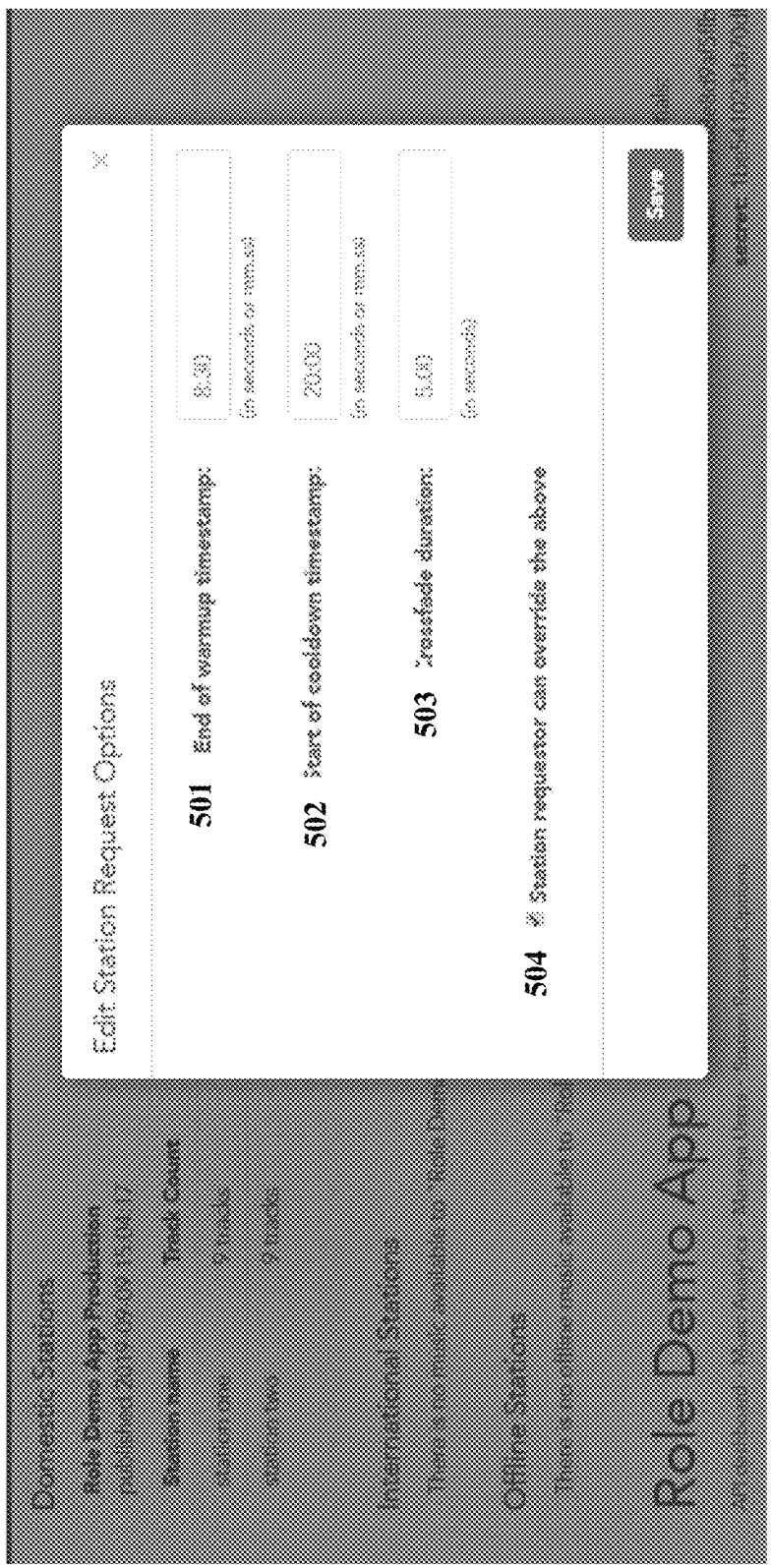
FIG. 5 shows a non-limiting example of a graphical user interface; in this case, a user interface depicting a user interface for an administrator to edit a first play station.

Referring to FIG. 5, a screenshot of a first play station global configuration is provided. In some embodiments, the first play station global configuration screen allows a first play station administrator to edit the station request options. In some embodiments, the administrator can designate when the end of warmup timestamp should be 501. In some embodiments, the administrator can designate when the start of the cooldown timestamp would be 502. In some embodiments, the administrator can designate the length of the crossfade duration 503. In some embodiments, the station requestor can override any of the aforementioned designations 504. In some embodiments, the first play station global configuration allows the global setting for the segment or the crossfade values. In some embodiments, the first play station global configuration provides the ability to override these at the station request level.

Music Playback Types and Limitations

In some embodiments, a Pandora-style Internet radio playback style interface is provided. In some embodiments, the Pandora-style Internet radio playback comprises a "default" playback type. In some embodiments, the Pandora-style Internet radio playback presents to the end-user a Pandora-style interface, where the user hears songs in a unique ordering, independent of other users, and the user can skip, like, or dislike songs. In some embodiments, songs are streamed over the Internet and not cached or stored locally. In some embodiments, the songs that a user hears may be partially chosen based on the user's playback history (for instance, disliked songs are never played again after they are disliked), but the user may not explicitly request specific songs for playback. In some embodiments. In some embodiments, catalog of songs available for this type of playback to users anywhere in the world. In some embodiments, use of any published songs that are commercially available for playback is available for users in the United States. In some embodiments, the software development kit (SDK) automatically determines a user's geographic location (by geo-mapping their IP address) and can make available one collection of music to US users, while another collection of music is made available to non-US users. In some embodiments, licensing restrictions prevent music from being played back in a pre-determined ordering and prevent the user from selecting specific songs for playback. In some embodiments, there are numerous playback restrictions concerning how often a song or artist or album can be repeated within a particular time period, but they are all handled automatically by the SDK. In some embodiments, the application may respond to song events (such as a song starting or stopping) or metadata (such as BPM or genre). In some embodiments, the application does not pick up specific songs for playback, nor expect a specific playback ordering, nor know the next song queued up for playback until it has started. In some embodiments, the Pandora-style Internet radio playback style can stream any commercially available music to US users. In some embodiments, the Pandora-style Internet radio playback style can allow users to skip songs (e.g., up to 1, 2, 3, 4, 5, 6, 7, 8, 9, or 10 per station per hour). In some embodiments, the Pandora-style Internet radio playback style can allow user actions to affect what music a user hears (e.g., disliking a song removes it from future playback). In some embodiments, the Pandora-style Internet radio playback style does not allow users to pick specific songs or a specific ordering of songs for playback. In some embodiments, the Pandora-style Internet radio playback style provides limited options for music selection for international users than for those in the US. In some embodiments, the Pandora-style Internet radio playback style can limit how often a particular song, artist, or album is played within some period, so stations must contain a mix of artists, songs, and album.

In some embodiments, a simulcast playback radio style interface is provided. In some embodiments, the same music is transmitted to all users simultaneously. In some embodiments, users may not skip songs, and their play history does not affect which songs are played. In some embodiments, this type of playback may have a specific song ordering or may be random. In some embodiments, each station loops through those songs 24/7 whether a client is listening or not. In some embodiments, the SDK automatically determines a user's geographic location (by geo-mapping their IP address) and can make available one set of stations to US users, which another set of stations made available to non-US users. In some embodiments, the application may respond to song events (such as a song starting or stopping) or metadata (such as BPM or genre). In some embodiments, the application does not pick up specific songs for playback, nor expect a specific playback ordering, nor skip songs. In some embodiments, the simulcast playback style can stream any commercially available music to US users. In some embodiments, the simulcast playback style can allow users to hear the same music at roughly the same time. In some embodiments, the simulcast playback style limits the music selection available for international users than for US users. In some embodiments, the simulcast playback style can limit how often a particular song, artist, or album may be played within some period, so stations must contain a mix of artists, songs, and album.

In some embodiments, an on-demand playback interface is provided. In some embodiments, this on-demand playback interface is useful for owned licensed music. In some embodiments, the on-demand playback interface allows a user to see a list of all available songs and stream any specific song at any time in any order. In some embodiments, the user can like, dislike, and skip songs. In some embodiments, songs are streamed over the Internet and not cached or stored on the local device. In some embodiments, the on-demand playback has the fewer playback restrictions but must provide the individually licensed songs for playback.

In some embodiments, an offline playback interface is provided. In some embodiments, the offline playback interface is like the Pandora-style Internet radio playback except that playback occurs while the user is offline. In some embodiments, the music must be downloaded to the local device before playback. In some embodiments, users can like, dislike, and skip songs. In some embodiments, song ordering is random and not predictable by the user. In some embodiments, the user may not select specific songs for playback. In some embodiments, reporting happens automatically when the playback device returns to Internet connectivity.

Integration Process

In some embodiments, music stations are created based on a user's needs. In some embodiments, these stations may be defined by genre, bpm, or something else entirely. In some embodiments, a development configuration and a production configuration filled with demo music is created. In some embodiments, each configuration will have a set of credentials (a token and secret value) associated with it that is passed to the SDK to connect it to your music stations. In some embodiments, these credentials are made available to users via a developer login. In some embodiments, it is recommended to configure the app to use the development credentials during development and testing, and use the production credentials with the released app. In some embodiments, it is recommended to copy the player code into the app, add the token and secret values, and wait for the music curation to be completed. In other embodiments, when consideration integrating the SDK into the application and constructing the user interface, the following should be considered: (1) where do you display the required song metadata (title, artist, album)?; (2) what do you do if streaming music is not available due to connectivity problems or geographic restrictions?; (3) metadata can be attached to each station—such as URLs to imagery, descriptive text, foreign keys, bpm information—do you need anything attached to your stations?; (4) do you let users skip, like, and dislike songs, or just play/pause?; (5) do you let users select stations, or do you choose for the user?; (6) do you let users play music in the background while your app is not active?; (7) do you want to send events to the music player so Feed.fm can perform analytics on user behavior with and without music? In some embodiments, when demo music in the station is replaced with curated music, no code changes should be required.

Before Going Live

In some embodiments, before releasing the application to the public (e.g., publishing), the following may need to be completed: (1) confirm the app functions properly when no Internet is available, or when the user isn't eligible for music playback (recommend using a VPN to test ineligibility); (2) confirm that users can see the current track title, artist, and album at least when the song starts; and (3) confirm that users can view the current track title, artist, and album at any time, or at least within one tap at any time.

Software Development Kits (SDKs), Calls Received by APIs that are Part of the SDK In some embodiments, the SDK is a set of tools and documentation that tells developers how to use the platform. In some embodiments, the SDK provides a singleton music player with play, pause, skip, like, dislike and volume controls. In some embodiments, the player, upon initialization, retrieves a list of available stations from the servers that the player can pull music from. In some embodiments, a single station is the active station from which songs are retrieved for playback. In some embodiments, the player generates and caches a random unique client id that is sent with all network requests to track playback history and enforce playback restrictions. In some embodiments, the player can be commanded to play and pause music playback. In some embodiments, all calls to the player are asynchronous, so events are emitted that indicate when songs start, elapse, and complete playback. In some embodiments, once the music begins, there will always be a current song with associated metadata that can be displayed to the user. In some embodiments, calls to like and dislike inform the servers how a user feels about the current song. In some embodiments, calls are received by application programming interfaces (APIs) that are part of the SDK. In some embodiments, A skip command doesn't immediately skip the current song, but rather a request is made to the server for permission to skip the song. In some embodiments, if the skip is granted, the current song will stop and the next will. In some embodiments, the player maintains a public state, which will be one of the following: (1) uninitialized: the player hasn't been given a token/secret pair yet; (2) unavailable: music is not available to the user for some reason; (3) ready to play: the player is idle and can begin playback, but hasn't; (4) offline only: the player is idle and ready to play, but only offline stations will currently work; (5) waiting for item: the player is waiting to be given a song to play; (6) stalled: the player is waiting for audio data for the current song (it is buffering); (7) playing: the player is actively playing a song; (8) paused: the player has paused playback; (9) requesting skip: the user has asked to skip the current song, and the player is waiting for permission from the servers to skip; or (10) complete: the player has run out of music to play in the active station and is now sitting idle. In some embodiments, playback commands and playback events function the same, regardless of whether the active station is streaming radio, simulcast, on-demand, or offline. In some embodiments, on-demand stations make available a list of songs that can be shown to the user and passed to the player for playback. In some embodiments, the servers may provide the player with a list of remote offline stations, which are stations available for download and offline playback. In some embodiments, the player may be asked to download a remote offline station, which results in a local offline station that is completely stored on the device and may be played even when no Internet connection is available, just like any other station. In some embodiments, remote offline stations may be downloaded in full at once or partially over time. Also, in some embodiments, the player may be asked to refresh the contents of local offline stations with any newly available music.

Client Libraries

In some embodiments, binary SDKs are offered for various platforms that handle basic audio playback and native device control integration. In some embodiments, the user interface must be built, various supporting views and controllers to assist are offered. In some embodiments, source code for complete music player interfaces that make use of the SDKs and can be pasted into an app or used as a model to help build a custom interface is offered.

In some embodiments, an iOS SDK/UIs are offered. In some embodiments, the iOS SDK is written in Objective-C and works on recent versions of iOS and tvOS. In some embodiments, the library can be retrieved via CocoaPods (pod FeedMedia in your Podfile), Carthage (GitHub "feedfm/iOS-SDK" in your Cartfile), or as a .framework file and headers from GitHub. In some embodiments, Appledocs are available for all versions including the latest version. In some embodiments, the iOS SDK depends on the MarqueeLabel library for a marquee effect on long UILabels that show metadata. In some embodiments, the iOS SDK is kept up to date with all our latest features and handles integration with the iOS lock screen for background playback, if desired. In some embodiments, 2 fully functional music player interfaces available as XCode projects on GitHub are offered: (1) RadioPlayer, which is available at github.com/feedfm/iOS-RadioPlayer, implements a simple tab interface to let the user switch between and control 2-3 streaming radio stations; and (2) RadioPlayer 2, which is available at github.com/feedfm/iOS-RadioPlayer-2, and supports any number of stations (by offering a page to list all available stations) and all our different station types (streaming, on demand, simulcast and offline).

In some embodiments, an Android SDK/UIs are available. In some embodiments, the Android SDK is written in Java, works back to API 16, and is compiled with the latest released Android API. In some embodiments, the SDK is available as an .aar via The Central Repository or from our GitHub Android SDK Release Page. In some embodiments, the SDK depends on Google's ExoPlayer for audio playback, as we've found that to work best in multiple environments. In some embodiments, because of changes in ExoPlayer's API and the difficulties involved in using different ExoPlayer versions at the same time, multiple versions of SDK are published, each linked to a different ExoPlayer version. In some embodiments, if a version of ExoPlayer that isn't currently published is being used, it can be added. In some embodiments, the Android SDK is kept up to date with all our latest features and handles integration with Android Notifications for lock screen playback control. In some embodiments, 2 fully functional music player interfaces available as Android Studio projects on GitHub: (1) RadioPlayer, which is available at github.com/feedfm/AndroidSDK2-Radioplayer, implements a simple tab interface to let the user switch between and control 2-3 streaming radio stations; and (2) RadioPlayer 2, is available at github.com/feedfm/AndroidSDK2-Radioplayer-2, and supports any number of stations and all different station types (streaming, on-demand, simulcast and offline).

In some embodiments, a JavaScript SDK is offered. In some embodiments, JavaScript SDK powers music playback for websites. In some embodiments, this SDK does not have all the features of native SDKs, but it does support basic streaming and simulcast playback. In some embodiments, the library is published via NPM as feed-media-audioplayer. In some embodiments, the SDK makes use of the HTML Audio element, and has no external dependencies. In some embodiments, if a single stand-alone web page with a music player or embed a small music player as an iframe within a page is desired, a mixtape product is offered. In some embodiments, a mixtape is a URL pointing to a customized responsive web player that doesn't require any coding. In some embodiments, underlying all our SDKs is a simple REST API.

In some embodiments, two fully functional native mobile music players are offered for apps that want to integrate music as a mostly stand-alone feature and that don't want to invest a lot of time in building a custom user interface from scratch. In some embodiments, the difference between these two players is primarily in the number of music stations that are supported. In some embodiments, the first music player (RadioPlayer) comprises a single screen that lets a user toggle between 2-3 music stations. In some embodiments, the top of the screen is a tabbed selector with a station name in each tab. In some embodiments, selecting a tab sets the active music station and begins music playback. In some embodiments, playback controls are available at the bottom of the screen. In some embodiments, music stations may have an image associated with them so when the user changes to a different station, the on-screen image changes as well. In some embodiments, the demo player assumes the background images are loaded from remote URLs, which are provided to the client as station metadata. In some embodiments, the second music player (RadioPlayer 2) comprises two screens: one is a grid of music stations available for playback, and the other displays a single music station and playback controls.

First Play Station

In some embodiments, a first play station is provided. In some embodiments, a first play station allows an efficient integration of validated music into another software application. In some embodiments, the first play station comprises song selections that adhere to licensing restrictions and requirements (both visual and playback). In some embodiments, song plays are reported to artists and licensing agencies, and proper payment remittance is provided. In some embodiments, music usage, interaction (likes, dislikes, skips) and session times (with and without music) are collected and reported. In some embodiments, a team of music curators work to select the best music for a song catalog. In some embodiments, the song selections are regularly refreshed based on user data and client feedback. In some embodiments, the first play station is the result of a user selecting amongst a plurality of audio media and sequencing the audio media to create an ordered combination of audio media, wherein each audio media in the ordered combination is validated.

Validating Audio Media

In some embodiments, audio media that is selected to be part of a first play station is validated. In some embodiments, audio media is validated by confirming that the audio media conforms to local copyright rules (e.g., DMCA).

Timepoints

In some embodiments, the media creator is provided an interface that allows the media creator to configure within an ordered combination of audio media an intro timepoint, an outro timepoint, or any combination thereof. In some embodiments, the beginning of the ordered combination of audio media and the intro timepoint comprises a warmup segment. In some embodiments, the end of the intro timepoint and the beginning of the outro timepoint comprises the main segment. In some embodiments, the beginning of the outro timepoint and the end of the ordered combination of audio media comprises a cooldown segment. In some embodiments, when an audio song reaches a timepoint, the song terminates and automatically transitions to the next song in the ordered combination. In some embodiments, a crossfade may be applied prior to transitioning from one song in the ordered combination to the next. In some embodiments, the length of the crossfade may be customized (e.g., 1 second, 2 seconds, 3 seconds, 4 seconds, 5 seconds, 6 seconds, 7 seconds, 8 seconds, 9 seconds, 10 seconds, etc.).

Generating at Least One Alteration to the Ordered Combination of Validated Audio Media In some embodiments, generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution. In some embodiments, the alternate audio media and the validated audio media are within about 5 bpm, 10 bpm, 15, bpm, 20 bpm, 25 bpm, 30 bpm, 35 bpm, 40 bpm, 45 bpm, or 50 bpm. In some embodiments, the alternate audio media and the validated audio media are within about 99% same duration, 98% same duration, 97% same duration, 96% same duration, 95% same duration, or 90% same duration. In some embodiments, the alternate audio media and the validated audio media are within about 99% same frequency range, 98% same frequency range, 97% same frequency range, 96% same frequency range, 95% same frequency range, or 90% same frequency range. In some embodiments, the alternate audio media and the validated audio media are within about 99% same frequency distribution, 98% same frequency distribution, 97% same frequency distribution, 96% same frequency distribution, 95% same frequency distribution, or 90% same frequency distribution. In some embodiments, the alteration to the ordered combination of validated audio media comprises playing the same songs in the combination, but in a different order (e.g., playing Song A, Song B, Song C, and Song D versus playing Song A, Song B, Song D, and Song C). In some embodiments, the alteration to the ordered combination of validated audio media comprises swapping out a song in the ordered combination with a different song with a similar title, genre, bpm, tempo, artist, duration, language, record label, composer, date, media franchise, medium, awards, album, explicit language, frequency range, or frequency distribution (e.g., playing Song A (100 bpm), Song B (110 bpm), Song C (70 bpm), and Song D (75 bpm) versus playing Song E (105 bpm), Song F (105 bpm), Song G (70 bpm), and Song H (75 bpm)).

Computing System

Figure 6:
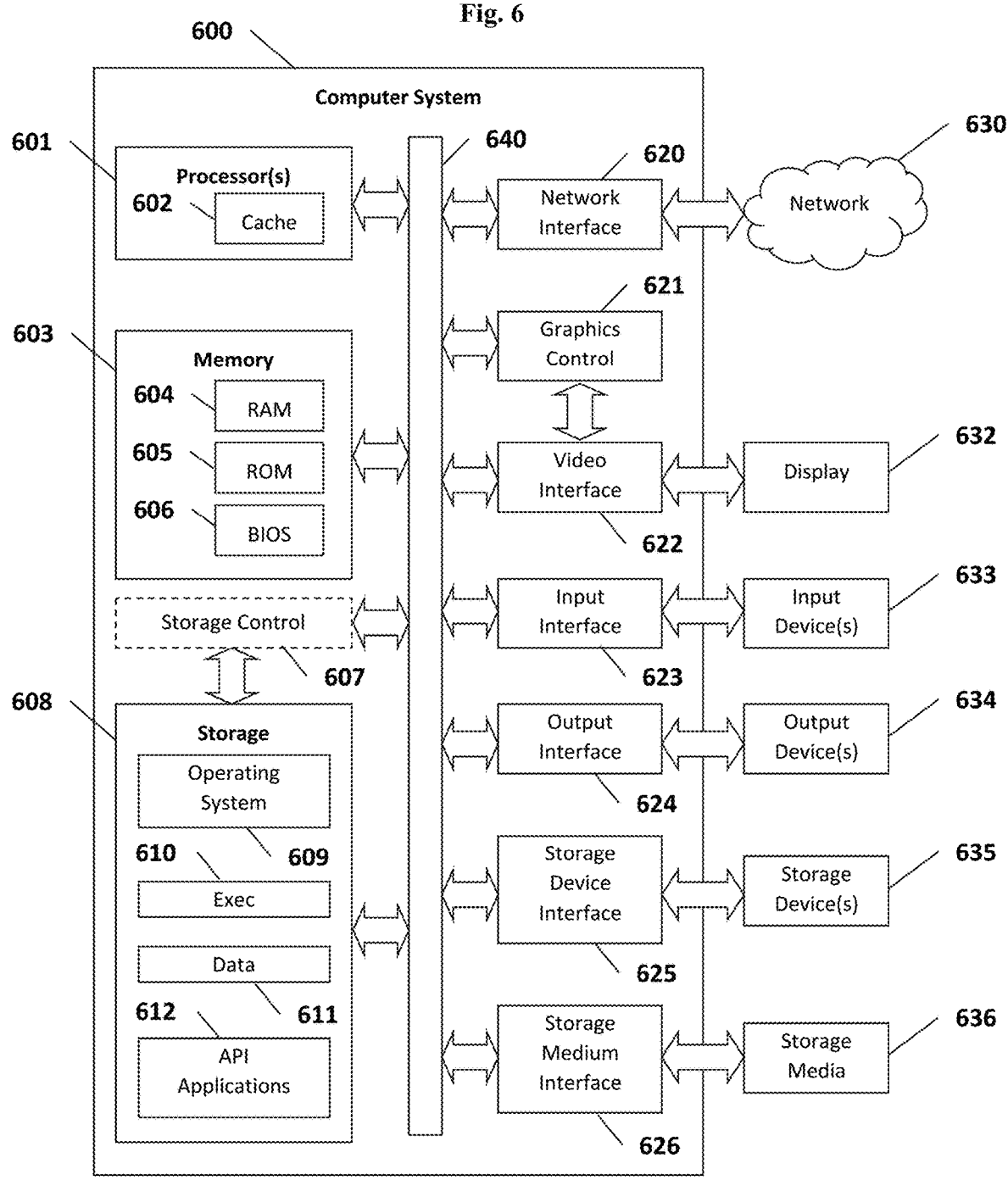
FIG. 6 shows a non-limiting example of a computing device; in this case, a device with one or more processors, memory, storage, and a network interface.

Referring to FIG. 6, a block diagram is shown depicting an exemplary machine that includes a computer system 600 (e.g., a processing or computing system) within which a set of instructions can execute for causing a device to perform or execute any one or more of the aspects and/or methodologies for static code scheduling of the present disclosure. The components in FIG. 6 are examples only and do not limit the scope of use or functionality of any hardware, software, embedded logic component, or a combination of two or more such components implementing particular embodiments.

Computer system 600 may include one or more processors 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 134, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 600 includes one or more processor(s) 601 (e.g., central processing units (CPUs) or general purpose graphics processing units (GPGPUs)) that carry out functions. Processor(s) 601 optionally contains a cache memory unit 602 for temporary local storage of instructions, data, or computer addresses. Processor(s) 601 are configured to assist in execution of computer readable instructions. Computer system 600 may provide functionality for the components depicted in FIG. 6 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., static RAM (SRAM), dynamic RAM (DRAM), ferroelectric random access memory (FRAM), phase-change random access memory (PRAM), etc.), a read-only memory component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, executable(s) 610, data 611, applications 612 (application programs), and the like. Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide non-volatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, distributed computing systems, cloud storage systems, cloud computing systems, and the like, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 630, may employ a wired and/or a wireless mode of communication. In general, any network topology may be used.

Information and data can be displayed through a display 632. Examples of a display 632 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 632, computer system 600 may include one or more other peripheral output devices 634 including, but not limited to, an audio speaker, a printer, a storage device, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition, or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research in Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku, Boxee®, Google TV®, GoogleChromecast®, Amazon Fire®, and Samsung® HomeSync®. Those of skill in the art will also recognize that suitable video game console operating systems include, by way of non-limiting examples, Sony® P53®, Sony® PS4®, Microsoft® Xbox 360®, Microsoft Xbox One, Nintendo® Wii °, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 7:
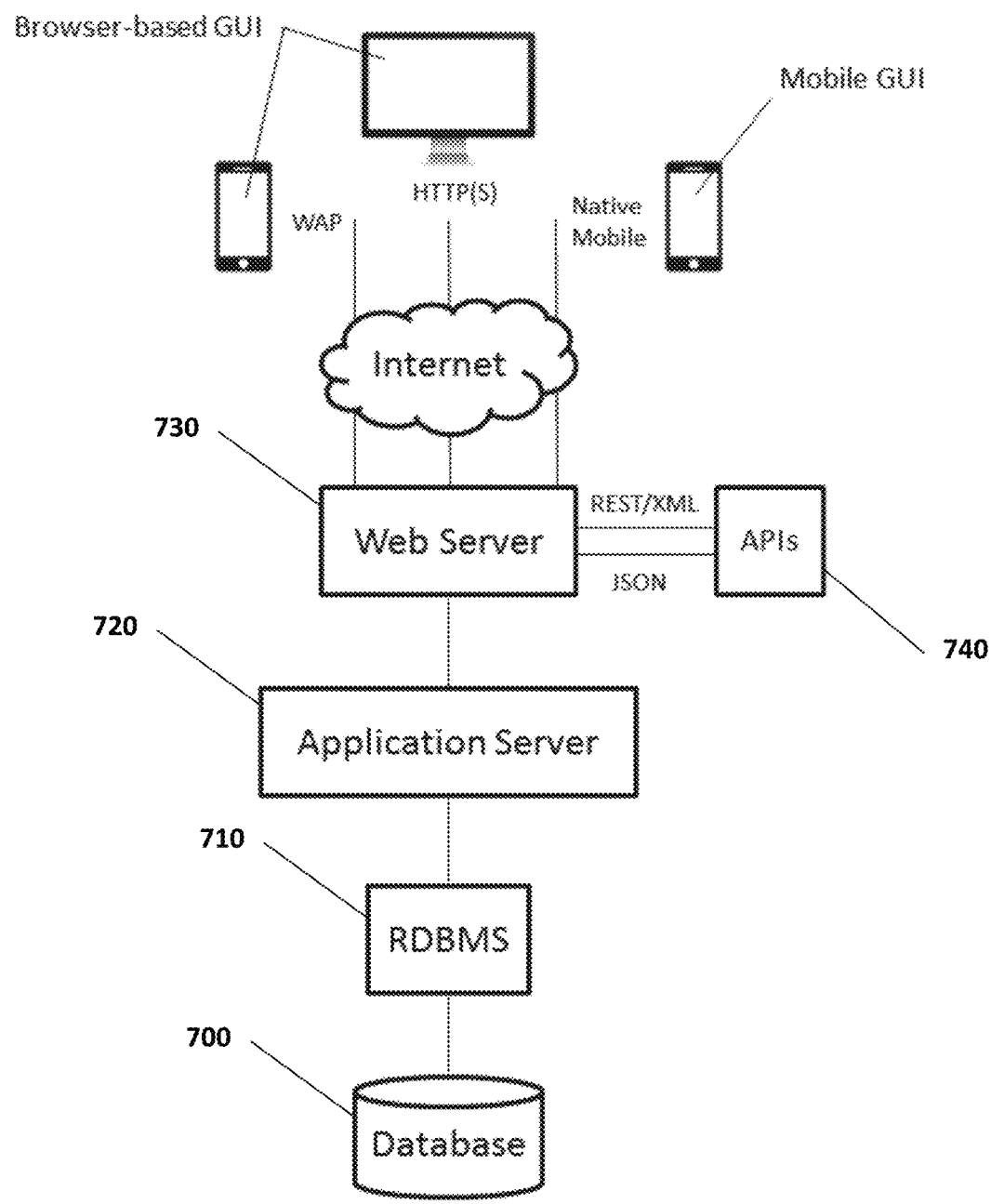
FIG. 7 shows a non-limiting example of a web/mobile application provision system; in this case, a system providing browser-based and/or native mobile user interfaces.

Referring to FIG. 7, in a particular embodiment, an application provision system comprises one or more databases 700 accessed by a relational database management system (RDBMS) 710. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 720 (such as Java servers, .NET servers, PHP servers, and the like) and one or more web servers 730 (such as Apache, IIS, GWS and the like). The web server(s) optionally expose one or more web services via app application programming interfaces (APIs) 740. Via a network, such as the Internet, the system provides browser-based and/or mobile native user interfaces.

Figure 8:
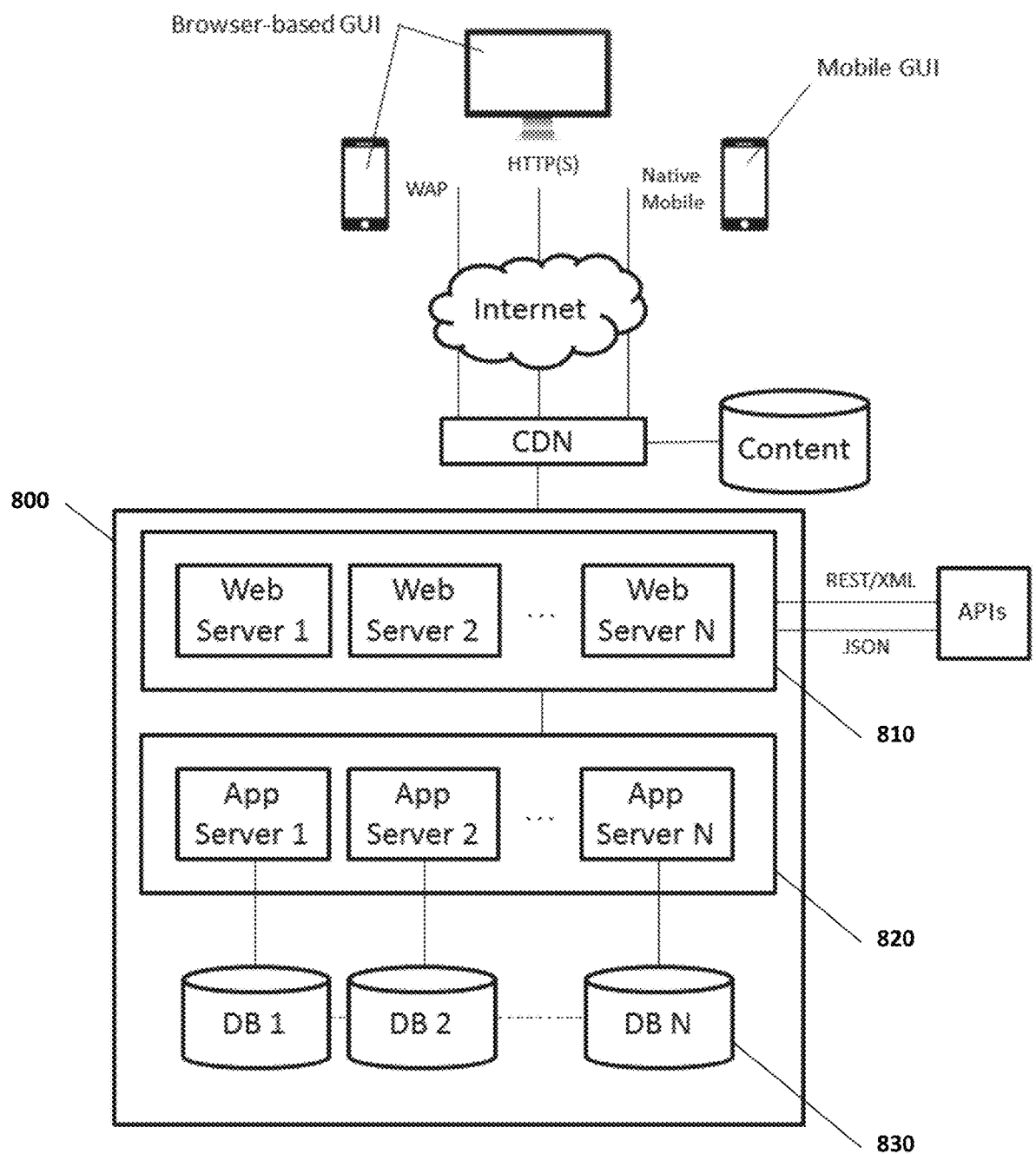
FIG. 8 shows a non-limiting example of a cloud-based web/mobile application provision system; in this case, a system comprising an elastically load balanced, auto-scaling web server and application server resources as well as synchronously replicated databases.

Referring to FIG. 8, in a particular embodiment, an application provision system alternatively has a distributed, cloud-based architecture 800 and comprises elastically load balanced, auto-scaling web server resources 810 and application server resources 820 as well synchronously replicated databases 830.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database.

In other embodiments, a database is based on one or more local computer storage devices.

EXAMPLES

The following illustrative examples are representative of embodiments of the software applications, systems, and methods described herein and are not meant to be limiting in any way.

Example 1—Creating and Playing a First Play Station for a Streaming Workout Video Arnold is a fitness instructor. Arnold wants to create a non-interactive music playlist that aligns with his 17-minute workout video and that also follows proper licensing rules for the music to be used during his workout video. Arnold's 17-minute workout video would have a warmup segment, a main workout segment, and a cooldown segment. For the warm-up section, Arnold wants music with a medium tempo, enough to get his participants motivated, but not too excited prior to the main workout segment. For the main workout segment, Arnold wants music with a high tempo—a mix of hip-hop and rap. For the cooldown segment, Arnold wants music with a slower tempo—songs with less than 90 beats per minute (bpm).

To create his music playlist, Arnold accesses a website that offers a Station Builder Web interface, which presents Arnold a variety of audio media selections to choose from. At the outset, Arnold inputs the title of his station "Arnold's Awesome Workout Mix" into a section in the Station Builder Web interface that is configured to receive the title or label of a user's station. Arnold then proceeds to input that he would like the warmup segment to be "3:00" and the main segment to be "10:00." Songs that exceed the total 13 minute duration are by default configured to be the songs to be played during the cooldown segment. He also notes that he wants a crossfade time of 6 seconds.

Next, Arnold goes through making his audio media selections. Arnold is able to search for specific songs and filter for songs that have explicit language. Arnold doesn't mind including explicit language in his playlist, so he includes that option. The Station Builder Web interface lists numerous song options, including the name of the artist, the album in which the song came from, and the duration of each song. For the warmup segment, Arnold selects Song A (1 minute, 50 seconds) and Song B (2 minutes, 45 seconds)—both have between 90 bpm and 110 bpm. For the main workout segment, Arnold selects Song C (3 minutes), Song D (2 minutes, 30 seconds), Song E (1 minute, 45 seconds), Song F (2 minutes 10 seconds), and Song G (3 minutes, 40 seconds). For the cooldown segment, Arnold selects Song H (2 minute, 20 seconds) and Song I (1 minute, 50 seconds). Each of these song selections are listed top-down in chronological order (Songs A-I) on the right side of the Station Builder Web interface, listing the song title and duration. Once a particular segment (e.g., warmup, main) ends, the intended playlist will crossfade out of the song playing at the moment and start playing the next song on the list.

Arnold is able to easily distinguish which songs are to be played during which segment of his workout video because different songs are color-coded depending on which segment the songs fall within. Here, Songs A and B are color-coded in orange because they fall within the 3-minute timepoint Arnold designated for the warmup. Songs C through G are color-coded white because they fall within the 11-minute timepoint Arnold designated for the main segment. Songs H and I are color-coded lavender because they fall within the 4-minute cooldown. In addition, beneath each selected song, Arnold is able to see the total duration of elapsed time in the proposed playlist, the crossfade between songs, and—when applicable—when the warmup or main section will end. For example, underneath selected Song B displayed on the right-hand side of the Station Builder Web interface, Arnold is able to see that the warmup period will end, and Song B will stop playing at a total duration of 2 minutes, 54 seconds (accounting for the 6 seconds of crossfade time). Underneath selected Song C displayed on the right-hand side of the Station Builder Web interface, Arnold is able to see the total duration played at the end of Song C will be 6 minutes (3 minutes of total Song C playing along with the 3 minutes of warmup time).

After every song selection is made and requested, DMCA compliance for each song is made. If a determination is made that the selected song is—for some reason—in violation of a DMCA playback rule or some other applicable copyright rule, the user is prompted to edit their song selection (e.g., remove the song from the initial ordered combination). After all the songs are determined to be DMCA compliant the list of songs is finalized, Arnold requests that the station be constructed. After the station is constructed, the station is sent to Arnold for him to listen to alone to confirm that the station was properly constructed. Arnold is able to listen to this station for as many times as he wants in the order that he selected to confirm that the station was properly constructed. Once Arnold is satisfied with the construction of the song station, Arnold confirms the creation and publication of the station to a Feed.fm platform. Arnold then proceeds to record himself doing a choreographed, 17-minute workout video, keeping in mind the order of songs he had just completed creating and matching the movements and instructions within his choreographed workout video to match the style of the different song selections in his station (e.g., doing medium pace warmup exercises during the first three minutes, doing fast paced exercises during the next ten minutes representative of the main segment, and doing a slow paced set of exercises during the final four minutes to match the cooldown segment; shouting encouragement, explaining exercises, raising or lower his voice to match the appropriate segment and timing). Once Arnold is satisfied, Arnold then publishes online his 17-minute workout video onto a third-party application while Arnold's finalized first play station is published onto a separate the Feed.fm platform.

Jane is a fitness client of Arnold's and wants to exercise from home. She opens her Android phone, accesses her third-party application, and is able to stream Arnold's published 17-minute workout video via this third-party application. Jane proceeds to watch the workout video in its entirety and is able to hear Songs A through I in that order as Jane watches and works out with the video for the very first time. The moment Jane presses "play" to start Arnold's 17-minute workout video, the SDK in Jane's third-party application of Jane's Android calls the API in the Feed.fm platform to simultaneously begin playing the start of Arnold's finalized first play station. As a result, the start of Arnold's 17-minute workout video playing on Jane's third-party application of Jane's Android is perfectly paired with the songs being played from Feed.fm platform (e.g., the first three minutes of Arnold's 17-minute workout video perfectly corresponds and matches with the first three minutes of Arnold's finalized first play station). The moment Jane presses "pause" to pause Arnold's 17-minute workout video, the SDK in Jane's third-party application of Jane's Android calls the API in the Feed.fm platform to simultaneously pause Arnold's finalized first play station, resulting in the pairing of the first play station and the workout video to remain consistent throughout the entire first play.

A few days later, Jane wants to workout at home using the same 17-minute video Arnold published. However, the second time Jane streams and plays through the video with her phone, Jane notices that the music overlaid over the workout video was no longer overlaid in the exact ordered combination as the first time she watched the workout video. Instead, she noticed that the warmup section (which was still 3 minutes long) instead was intentionally shuffled and played Song B first, then Song A (instead of the original A and B) before transitioning to the main segment. A third time Jane streams the video with her phone, the cooldown segment (which still started 13 minutes into the 17-minute workout video) was intentionally shuffled and played new Songs Y and Z (songs that Arnold had not even seen or selected when creating the original first play station, but has a similar bpm under 90 like Songs H and I) instead of Songs H and I. Every single time Jane streams and plays through Arnold's 17-minute workout video, the music overlaid over the workout video is different from any combination of music Jane has previously heard in past streams, complying with the appropriate DMCA playback rules. This is because, in some embodiments, the intelligent shuffle feature of the claimed subject matter generates at least one alteration to the ordered combination of Songs A-I after Jane's initial play.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A platform comprising:
   a) at least one server comprising at least one processor, an operating system configured to perform executable instructions, a memory, and a computer program including instructions executable to cause the at least one server to perform at least the following:
      i) provide a first user interface allowing a media creator to select a plurality of audio media and sequence the selected audio media to create an ordered combination of audio media and request a first play station;
      ii) validate each audio media in the ordered combination to create a first play station, wherein validating audio media comprises checking compliance with copyright playback rules or licensing restrictions, wherein the first play station comprises a first play station play time length;
      iii) provide a second user interface allowing the media creator to play the first play station;
      iv) publish the first play station;
      v) receive a call from a third party player application to prompt the published first play station from the at least one server; and
      vi) generate at least one alteration to the ordered combination of validated audio media, wherein the at least one alteration is selected from the group consisting of: an alternate validated audio media, an alternate sequence of the ordered combination of validated audio media, or a combination thereof, wherein the at least one alteration to the ordered combination of validated audio media is based on compliance with copyright playback rules or licensing requirements, wherein every generated altered combination of validated audio media comprises a total play time length that is the same as the first play station play time length; and
   b) at least one end user device comprising at least one processor, an operating system configured to perform executable instructions, a memory, and a computer program including instructions executable by the end user device to cause the end user device to perform at least the following:
      i) provide a third party player application allowing an end user to play a video; wherein a start of the video sends the call from the third party player application to the published first play station on the at least one server to start the published first play station so the starts of the video and the published first play station are paired on the third party application; wherein in an initial play by the end user the published first play station consists of the ordered combination of validated audio media; and wherein in each subsequent play by the end user the published first play station comprises the at least one alteration to the ordered combination of validated audio media, wherein the at least one alteration to the ordered combination of validated audio media is based on compliance with copyright playback rules or licensing requirements, wherein each altered combination of validated audio media comprises a total play time that is the same as the first play station play time.

2. The platform of claim 1, wherein the first user interface further allows the media creator to select audio media based on title, genre, beats per minute (bpm), tempo, artist, duration, language, record label, composer, date, media franchise, medium, awards, album, explicit language, or any combination thereof.

3. The platform of claim 1, wherein the first user interface further allows the media creator to configure a crossfade time for one or more validated audio media.

4. The platform of claim 1, wherein the second user interface further provides one or more visual cues when the first play station is playing.

5. The platform of claim 1, wherein publishing the video comprises streaming the video to one or more end user devices.

6. The platform of claim 1, wherein the alternate validated audio media is different from the validated audio media.

7. The platform of claim 6, wherein generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution.

8. The platform of claim 7, wherein the alternate audio media and the validated audio media are within 5 bpm, 10 bpm, 15, bpm, 20 bpm, 25 bpm, 30 bpm, 35 bpm, 40 bpm, 45 bpm, or 50 bpm.

9. The platform of claim 7, wherein the alternate audio media and the validated audio media are within 99% same duration, 98% same duration, 97% same duration, 96% same duration, 95% same duration, or 90% same duration.

10. The platform of claim 7, wherein the alternate audio media and the validated audio media are within 99% same frequency range, 98% same frequency range, 97% same frequency range, 96% same frequency range, 95% same frequency range, or 90% same frequency range.

11. The platform of claim 7, wherein the alternate audio media and the validated audio media are within about 99% same frequency distribution, 98% same frequency distribution, 97% same frequency distribution, 96% same frequency distribution, 95% same frequency distribution, or 90% same frequency distribution.

12. The platform of claim 1, wherein the first user interface further displays a running tally of the ordered combination of audio media after every selected audio media.

13. The platform of claim 1, the computer program including instructions executable to cause the at least one server to further perform: provide a third user interface configured to allow the setting of global configuration values.

14. The platform of claim 1, wherein the first user interface allows the media creator to designate an intro timepoint within the ordered combination of audio media, wherein when the first play station reaches a designated intro timepoint in the initial play, the first play station automatically trims a current validated audio media in the ordered combination of validated media and crossfades to a next validated audio media in the ordered combination of validated media.

15. The platform of claim 14, wherein designating the intro timepoint within the ordered combination of audio media automatically designates an identical intro timepoint within every generated altered combination of validated audio media, wherein when the first play station reaches the designated identical intro timepoint in each subsequent play, the first play station automatically trims a current validated audio media in the altered ordered combination of validated media and crossfades to a next validated audio media in the altered ordered combination of validated media.

16. The platform of claim 14, wherein the first user interface allows the media creator to designate an outro timepoint after the designated intro timepoint within the ordered combination of audio media, wherein when the first play station reaches a designated outro timepoint in the initial play, the first play station automatically trims a current validated audio media in the ordered combination of validated media and crossfades to a next validated audio media in the ordered combination of validated media.

17. The platform of claim 16, wherein designating the outro timepoint within the ordered combination of audio media automatically designates an identical outro timepoint within every generated altered combination of validated audio media, wherein when the first play station reaches the designated identical intro timepoint in each subsequent play, the first play station automatically trims a current validated outro media in the altered ordered combination of validated media and crossfades to a next validated audio media in the altered ordered combination of validated media.

18. The platform of claim 16, wherein the ordered combination of audio media within the intro timepoint comprises an intro segment, wherein the ordered combination of audio media after the intro timepoint and before the outro timepoint comprises a main segment, wherein the ordered combination of audio media after the outro timepoint comprises an outro segment, or any combination thereof.

19. The platform of claim 18, wherein the first user interface further color codes one or more segments.

20. Non-transitory computer-readable storage media encoded with a computer program including instructions executable by the one or more processors to create and publish a first play station comprising:
   a) a software module configured to provide a first user interface allowing a media creator to select a plurality of audio media and sequence the selected audio media to create an ordered combination of audio media and request a first play station;
   b) a software module configured to validate each audio media in the ordered combination to create a first play station, wherein validating audio media comprises checking compliance with copyright playback rules or licensing restrictions, wherein the first play station comprises a first play station play time length;
   c) a software module configured to provide a second user interface allowing the media creator to play the first play station;
   d) a software module configured to publish the first play station from at least one server;
   e) a software module configured to receive a call from a third party player application to prompt the published first play station; and
   f) a software module configured to generate at least one alteration to the ordered combination of validated audio media, wherein the at least one alteration is selected from the group consisting of: an alternate validated audio media, an alternate sequence of the ordered combination of validated audio media, or a combination thereof, wherein the at least one alteration to the ordered combination of validated audio media is based on compliance with copyright playback rules or licensing requirements, wherein each generated altered combination of validated audio media comprises a total play time length that is the same as the first play station play time length;
   wherein start of a video on the third party player application sends the call to the published first play station to start the published first play station so the starts of the video and the published first play station are paired on the third party application, wherein an initial play of the published first play station consists of the ordered combination of validated audio media; and wherein in each subsequent play of the published first play station comprises the at least one alteration to the ordered combination of validated audio media, wherein the at least one alteration to the ordered combination of validated audio media is based on compliance with copyright playback rules or licensing requirements, wherein each altered combination of validated audio media comprises a total play time length that is the same as the first play station play time length.

21. The media of claim 20, wherein the first user interface further allows the media creator to select audio media based on title, genre, beats per minute (bpm), tempo, artist, duration, language, record label, composer, date, media franchise, medium, awards, album, explicit language, or any combination thereof.

22. The media of claim 20, wherein publishing the video comprises streaming the video to one or more end user devices.

23. The media of claim 20, wherein the alternate validated audio media is different from the validated audio media.

24. The media of claim 23, wherein generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution.

25. A computer-implemented method of creating and publishing a first play station, the method comprising:
   a) providing a first user interface allowing a media creator to select a plurality of audio media and sequence the selected audio media to create an ordered combination of audio media and request a first play station;
   b) validating each audio media in the ordered combination to create a first play station wherein validating audio media comprises checking compliance with copyright playback rules or licensing restrictions, wherein the first play station comprises a first play station play time length;
   c) providing a second user interface allowing the media creator to play the first play station;
   d) publishing the first play station from at least one server; and
   e) receiving a call from a third party player application to prompt the published first play station; and
   f) generating at least one alteration to the ordered combination of validated audio media, wherein the at least one alteration is selected from the group consisting of: an alternate validated audio media, an alternate sequence of the ordered combination of validated audio media, or a combination thereof, wherein the at least one alteration to the ordered combination of validated audio media is based on compliance with copyright playback rules or licensing requirements, wherein every generated altered combination of validated audio media comprises a total play time length that is the same as the first play station play time length,
   wherein a start of a video on the third party player application sends the call to the published first play station on the at least one server to start the published first play station so the starts of the video and the published first play station are paired on the third party application, wherein an initial play of the published first play station consists of the ordered combination of validated audio media; and wherein in each subsequent play of the published first play station comprises the at least one alteration to the ordered combination of validated audio media, wherein the at least one alteration to the ordered combination of validated audio media is based on compliance with copyright playback rules or licensing requirements, wherein each altered combination of validated audio media comprises a total play time length that is the same as the first play station play time length.

26. The method of claim 25, wherein the first user interface further allows the media creator to select audio media based on title, genre, beats per minute (bpm), tempo, artist, duration, language, record label, composer, date, media franchise, medium, awards, album, explicit language, or any combination thereof.

27. The method of claim 25, wherein the alternate validated audio media is different from the validated audio media.

28. The method of claim 25, wherein generating the at least one alteration to the ordered combination of validated audio media comprises selecting one or more alternate audio media based on similarity to a validated audio media with regard to at least one of the following characteristics: title, genre, bpm, tempo, artist, duration, language, record label, composer, date, media franchise, medium, awards, album, explicit language, frequency range, or frequency distribution.

* * * * *